United States Patent
Schulze et al.

(10) Patent No.: US 6,952,972 B2
(45) Date of Patent: Oct. 11, 2005

(54) FORCE SENSOR

(75) Inventors: Werner Schulze, Goettingen (DE);
Michael Wald, Hildesheim (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 10/893,890

(22) Filed: Jul. 20, 2004

(65) Prior Publication Data

US 2005/0050957 A1 Mar. 10, 2005

Related U.S. Application Data

(63) Continuation of application No. PCT/EP03/00332, filed on Jan. 15, 2003.

(30) Foreign Application Priority Data

Jan. 21, 2002 (DE) .......................................... 102 02 401

(51) Int. Cl.[7] ................................................. G01D 7/00
(52) U.S. Cl. ................................................. 73/862.041
(58) Field of Search ........................... 73/862.041, 862, 73/862.045, 862.381, 862.474, 862.392

(56) References Cited

U.S. PATENT DOCUMENTS 4,899,599 A 2/1990 Eddens 6,002,090 A 12/1999 Johnson et al.
6,647,811 B2 * 11/2003 Blakesley et al. ..... 73/862.391

FOREIGN PATENT DOCUMENTS

WO  WO 02/08705 A1  1/2002

* cited by examiner

*Primary Examiner*—Edward Lefkowitz
*Assistant Examiner*—Takisha Miller
(74) *Attorney, Agent, or Firm*—Sughrue Mion, PLLC

(57) ABSTRACT

A force sensor with two force input elements to which the force to be measured and the support force are applied. The two force input elements are substantially rotationally symmetrical and are axially spaced apart, and the force to be measured and the support force are applied in a radial direction. A spring element, arranged axially between the two force input elements connects these elements and its load-dependent deformation is converted into an electrical signal. A substantially tubular cover connected to one of the two force input elements surrounds the spring element. The cover surrounds a portion of the other force input element, forming a circumferential gap. The cover has an inwardly projecting constriction that is spaced apart by a small axial distance from an opposite shoulder on the other force input element.

12 Claims, 2 Drawing Sheets

FORCE SENSOR

CROSS-REFERENCE TO RELATED APPLICATIONS

This is a Continuation of International Application PCT/EP03/00332, with an international filing date of Jan. 15, 2003, which was published under PCT Article 21(2) in German, and the disclosure of which is incorporated into this application by reference.

FIELD OF THE INVENTION

The invention relates to a force sensor with two force input elements to which the force to be measured and the support force are applied. The two force input elements are substantially rotationally symmetrical and are axially spaced apart. The force to be measured and the support force are applied in radial direction. A spring element, arranged axially between the two force input elements connects these elements, and its load dependent deformation is converted into an electrical signal. A substantially tubular cover, connected to one of the two force input elements, surrounds the spring element.

BACKGROUND TO THE INVENTION

Force sensors are known, for example, from U.S. Pat. No. 6,002,090.

A drawback of this type of force sensor is that it does not provide protection against excessively large forces acting thereon. As a result, excessively large forces or an overload can destroy the force sensor. Furthermore, if the overload is very large, the spring element can shear or tear off completely, such that the force sensor no longer provides a mechanical connection between the screwed-down force input elements.

For example, if a seat in a passenger car is connected to the chassis so that the weight load of the seat can be measured, the shearing-off of the connecting spring elements (typically four in number) in the event of a crash would have the result that the seat is no longer connected to the chassis. This, however, must be prevented under all circumstances, if possible. The term overload protection as used below should thus be understood to mean both the protection of the force sensor itself in the event of relatively small overloads and the protection against tear-out or complete shearing of the items fastened via the force sensor in the event of large overloads. In the conventional force sensor, an overload protection of this type must be provided outside the force sensor by a corresponding configuration of the mounting environment, which is often difficult and costly to implement.

OBJECTS OF THE INVENTION

Thus, an object of the invention is to provide a force sensor that has an integrated force protection.

SUMMARY OF THE INVENTION

According to the invention, the foregoing object is attained by having the cover of the force sensor also surround a portion of the other force input element, forming a circumferential gap, wherein the cover has an inwardly projecting constriction that is spaced apart by a small axial distance from an opposite shoulder on the other force input element. As a result, if there is either a radial or an axial overload, the other force input element rests against a portion of the cover after a slight deflection. The cover is rigid enough so that it can transmit the overload forces from one force input element to the other force input element.

Thus, the tubular cover, which in U.S. Pat. No. 6,002,090 is provided around the spring element to protect it against environmental influences, is on the one hand extended and provided with a projecting constriction, such that it acts as a limit or stop in both radial and axial directions in the event that the spring element is displaced too far. The tubular cover is reinforced, such that it can absorb the excess forces in the event of an overload and can transmit them past the spring element.

Other advantageous embodiments are derived from the invention described below.

BRIEF DESCRIPTION OF THE DRAWINGS

The invention will now be described with reference to the schematic figures in which.

DETAILED DESCRIPTION OF THE PREFERRED EMBODIMENTS

Figure 2:
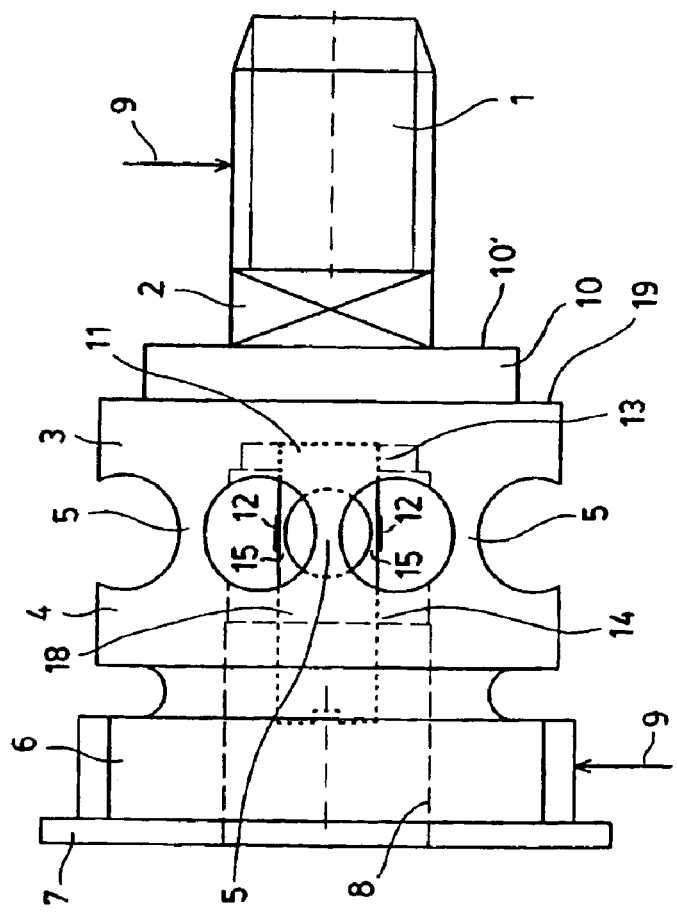
FIG. 2 shows a side view of the force sensor without the cover.

The force sensor without the overload protection is best understood from the side view of FIG. 2. The force input element for the forces to be measured (force arrows 9) is a threaded bolt 1, on the one hand, and a flange 7 with an adjoining threaded collar 6 and a rigid area 4 through which a blind hole 8 extends, on the other hand. The threaded bolt 1 has a square base 2 to orient the force sensor relative to the force to be measured, which is adjoined by a disk-shaped area 10 and then merged into a rigid area 3. The spring element, which is divided into two parts, an outer spring element 5 and an inner spring element 15, is disposed between the two force input elements 1/2/10/3 and 4/6/7. The rigid ends 11 and 18 of the inner spring element 15 are connected to the outer areas 3 and 4 (e.g., by welding, bonding, shrink fitting, etc.) in the areas 13 and 14. Under the action of the force to be measured, both the outer spring element 5 and the inner spring element 15 are bent. The deformation of the inner spring element 15 is converted into an electrical signal by a strain gauge 12. The mounting of strain gauges and the evaluation of their change in resistance in a Wheatstone bridge are generally known and described also in the cited U.S. Pat. No. 6,002,090, so that they need not be explained here.

Figure 1:
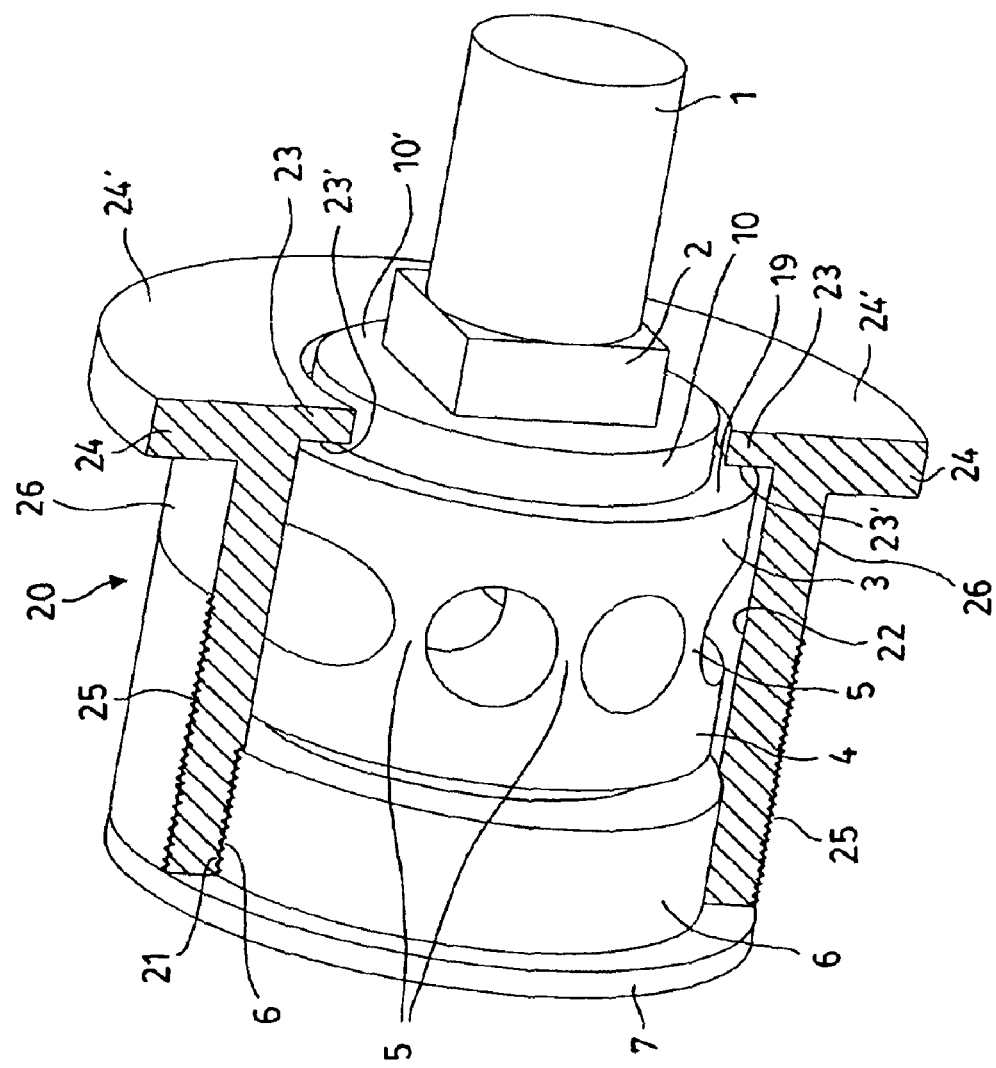
FIG. 1 shows a perspective view of the force sensor with a partially cutaway sleeve or cover.
Figure 3:
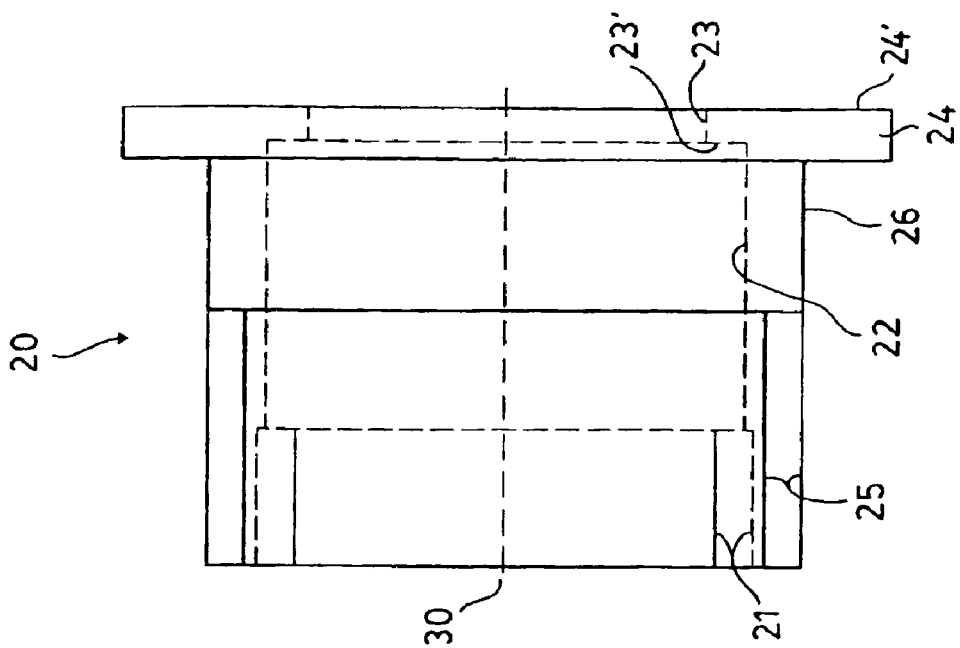
FIG. 3 shows a side view of the cover sleeve alone.

The overload protection is obtained by a screwed-down cover sleeve 20, which is shown separately in a side view in FIG. 3 and is also visible, partially cutaway, in the general perspective view of the force sensor in FIG. 1. The cover sleeve is rotationally symmetrical with the axis of symmetry 30. The inner hollow space 22 of the cover sleeve has an internal thread 21 at its left end as shown in the figures, which is screwed onto the threaded collar 6. This firmly connects the cover sleeve 20 to the force input element 6/7. The diameter of the inner hollow space 22 of the cover sleeve is dimensioned such that it is 0.4 to 1.0 mm larger than the outside diameter of the rigid areas 3 and 4. This leaves a circumferential gap of 0.2 to 0.5 mm between the rigid areas 3/4 and the cover sleeve 20. If the force to be measured is large enough so that the outer spring element and the inner spring element deflect by more than 0.2 to 0.5 mm, then the area 3 will rest against the internal wall 22 of the cover sleeve and the area 10 against the internal wall of an constriction 23. As a result, the deflection will be limited to approximately that amount. The cover sleeve 20 is dimensioned to be rigid enough to transmit the overload forces from the threaded bolt 1 to the flange 7 without any appreciable bending and thus to deflect them around the spring elements 5 and 15. This overload protection for forces in the measuring direction (force arrows 9) works likewise for forces perpendicular thereto—i.e., perpendicular to the drawing plane in FIG. 2.

An overload protection is also realized for axial forces—i.e., in the right/left direction as seen in the figures. For this purpose the cover sleeve 20 has the inwardly projecting constriction 23. This constriction is aligned with the area 10, such that the shoulder 23' on the constriction 23 is axially spaced apart by a small distance from the opposite shoulder 19 to provide overload protection against excessively large axial forces toward the right. Overload protection against excessively large axial forces toward the left can be easily realized externally by configuring the force application at the force input element 1 in such a way that in the event of an overload on the side face 24' of the flange 24 of the cover sleeve, the force is applied to the cover sleeve.

The cover sleeve 20, in addition to its overload protection function, has the further advantage that, because it is a component rigidly connected to the force input element 6/7, it enables the application of the force to be measured and the support force not only to the force input element 6/7 but also to any other area of the cover sleeve 20. This can be, for example, the outer thread 25 or the threadless area 26 or the flange 24. For example, a force input pin with a hole can encircle the threadless area 26 and can be captured between the flange 24 and a nut on the threaded area 25. Depending on the requirements, this can be accomplished in such a way that the force input pin is either firmly fixed to the cover sleeve or is only rotatably captured. The force application at or near the flange 24 has the advantage that the lateral offset of the force and the support force (force arrows 9 in FIG. 2) remains small and, as a result, the torque applied to the force sensor also remains small.

To protect the interior of the force sensor from dirt, dust or water, an elastic foil may be glued, for example, between the front face 24' of the flange 24 and the front face 10' of the area 10. This foil should be soft enough so that it does not act as a force bypass in practice.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A force sensor, comprising:
   a substantially rotationally symmetric member having an axis, comprising:
      a first force input element for receiving a force to be measured applied in a first radial direction of the force sensor;
      a second force input element for receiving a support force applied in a second radial direction of the force sensor, the second force input element axially spaced from the first force input element;
      a spring assembly disposed between the first force input element and the second force input element, the spring assembly integral with or mechanically coupled to the first force input element and the second force input element, and wherein deformation of the spring assembly is converted into a corresponding electrical signal; and
   a tubular cover coupled to one of the first force input element and the second force input element, the cover surrounding the spring assembly and covering at least a portion of the other force input element, leaving a circumferential gap between the cover and the other force input element; the cover comprising an inwardly projecting constriction that is spaced apart by an axial distance from an opposing shoulder of the other force input element, so that, in an event of a radial overload or an axial overload on the force sensor, the other force input element deflects and rests against a portion of the cover, the cover having adequate rigidity to transmit the overload between the one force input element and the other force input element.

2. The force sensor as claimed in claim 1, wherein the cover is screwed onto the one force input element as a cover sleeve.

3. The force sensor as claimed in claim 1, wherein at least one of the force to be measured and the support force is applied to the cover.

4. The force sensor as claimed in claim 1, wherein the circumferential gap is 0.2–0.5 mm wide.

5. The force sensor as claimed in claim 1, wherein the cover is coupled to the second force input element, the second force input element is axially spaced apart from the first force input element, and the spring assembly is disposed axially between the first force input element and the second force input element.

6. The force sensor as claimed in claim 5, wherein the cover extends axially beyond the second force input element and is a stop that restricts deflection of the first force input element by a distance corresponding to the circumferential gap.

7. A force sensor, comprising:
   a member having an axis, comprising:
      a first force input element receiving a first force applied to the force sensor;
      a second force input element receiving a second force applied to the force sensor in a direction opposing the first force, the second force input element axially spaced from the first force input element;
      a spring assembly disposed between the first force input element and the second force input element, the spring integral with or mechanically coupled to the first force input element and the second force input element, and wherein deformation of the spring assembly is converted into a corresponding electrical signal; and
   a cover coupled to the first force input element, the cover surrounding the spring assembly and covering at least a portion of the second force input element, leaving a circumferential gap between the cover and the second force input element, so that when an overload force is applied to the force sensor, the second force input element deflects relative to the cover until the gap closes at at least one point and the second force input element abuts the cover, and wherein the cover has a higher rigidity than the spring assembly in a radial direction of the force sensor.

8. The force sensor as claimed in claim 7, wherein the cover comprises an inwardly projecting constriction that is spaced apart by an axial distance from an opposing face of the second force input element.

9. The force sensor as claimed in claim 7, wherein the member is substantially symmetrical about the axis, and wherein the cover is tubular.

10. The force sensor as claimed in claim 7, wherein the circumferential gap is about 0.2–0.5 mm wide.

11. The force sensor as claimed in claim 7, wherein the second force input element is axially spaced apart from the first force input element and the spring assembly is disposed axially between the first force input element and the second force input element.

12. The force sensor as claimed in claim 11, wherein the cover extends axially beyond the first force input element and is a stop that restricts deflection of the second force input element by a distance corresponding to the circumferential gap.

* * * * *